(12) United States Patent
Liao

(10) Patent No.: US 6,803,525 B1
(45) Date of Patent: Oct. 12, 2004

(54) RETRACTABLE CABLE DEVICE

(76) Inventor: Sheng Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 0 days.

(21) Appl. No.: 10/750,950

(22) Filed: Jan. 5, 2004

(51) Int. Cl.$^7$ .............................................. H02G 11/02
(52) U.S. Cl. ..................... 174/135; 174/50; 174/117 F; 191/12.4; 439/35
(58) Field of Search ..................... 174/135, 50, 117 F, 174/113 R, 69; 191/12.4; 439/35, 456

(56) References Cited

U.S. PATENT DOCUMENTS

| | | | |
|---|---|---|---|
| 3,346,705 A | * 10/1967 | Slinkard | ..................... 191/12.4 |
| 6,253,893 B1 | * 7/2001 | Chi-Min | ..................... 191/12.4 |
| 6,452,108 B1 | * 9/2002 | Major | ..................... 174/135 |

* cited by examiner

Primary Examiner—Dhiru Patel
(74) Attorney, Agent, or Firm—Rosenberg, Klein & Lee

(57) ABSTRACT

A retractable cable device is disclosed. The housing has a receiving space, and the winding spool has a first spool disk and a spring receiving space. The first spool disk includes a receiving groove and a spool shaft. The communication cable is wound around the spool shaft so that an inner winding is formed. One end of the communication cable passes through the first spool disk of the winding spool so that the communication cable is respectively positioned at the receiving groove and the spool shaft of the first spool disk. Both ends of the communication cable protrude the housing of the retractable cable device. The spiral spring is positioned at the spring receiving space of the winding spool, and one end of the spiral spring is coupled to the winding spool and the other end of the spiral spring is coupled to the housing of the retractable cable device.

14 Claims, 16 Drawing Sheets

RETRACTABLE CABLE DEVICE

BACKGROUND OF THE INVENTION

1. Field of the Invention

The present invention relates to a retractable cable device, and in particular to a retractable cable device that will automatically retract and store longer communication cables.

2. Description of Related Art

With the advent of electronic devices, computers, modems, telephones or facsimile machines are connected with proper communication cables. When the communication cables are too long, it is prone to get entangled. When length of the communication cables is not enough, it is impractical. Several retractable cable devices have been already marketed. In general, the retractable cable device has a housing, a communication cable, a winding spool and a spring so that an electrical plug of the communication cable can be inserted to corresponding electrical receptacle to download information.

Besides, the communication cables are subjected to large elastic force of the spring and in tensile condition when they are pulled out of the conventional retractable cable device. Thus, it results in insufficient length of the communication cable out of the conventional retractable cable device.

As described above, the communication cable is wound around the winding spool and is limited by receiving space of the winding spool. The conventional retractable cable device fails to accommodate a longer length of the communication cable.

Thus, there is need to development for a retractable cable device.

SUMMARY OF THE DISCLOSURE

It is an object of the present invention to provide a retractable cable device. Communication cables are respectively positioned in a receiving groove of a first spool disk and around a winding spool. A resilient member is positioned within the winding spool so that longer length of the communication cable is stored within the retractable cable device.

In order to accomplish one object of the present invention, the present invention provides a retractable cable device. The retractable cable device includes a housing, a winding spool, a communication cable and a spiral spring. The housing has a receiving space, and the winding spool has a first spool disk and a spring receiving space. The first spool disk includes a receiving groove and a spool shaft, and the winding spool is pivotally connected within the receiving space of the housing. The communication cable is wound around the spool shaft of the winding spool so that an inner winding is formed. One end of the communication cable passes through the first spool disk of the winding spool so that the communication cable is respectively positioned at the receiving groove and the spool shaft of the first spool disk. Both ends of the communication cable protrude the housing of the retractable cable device.

The spiral spring is positioned at the spring receiving space of the winding spool, and one end of the spiral spring is coupled to the winding spool and the other end of the spiral spring is coupled to the housing of the retractable cable device.

BRIEF DESCRIPTION OF DRAWINGS

The present invention can be fully understood from the following detailed description and preferred embodiment with reference to the accompanying drawings in which.

DETAILED DESCRIPTION OF THE PREFERRED EMBODIMENTS

Figure 1:
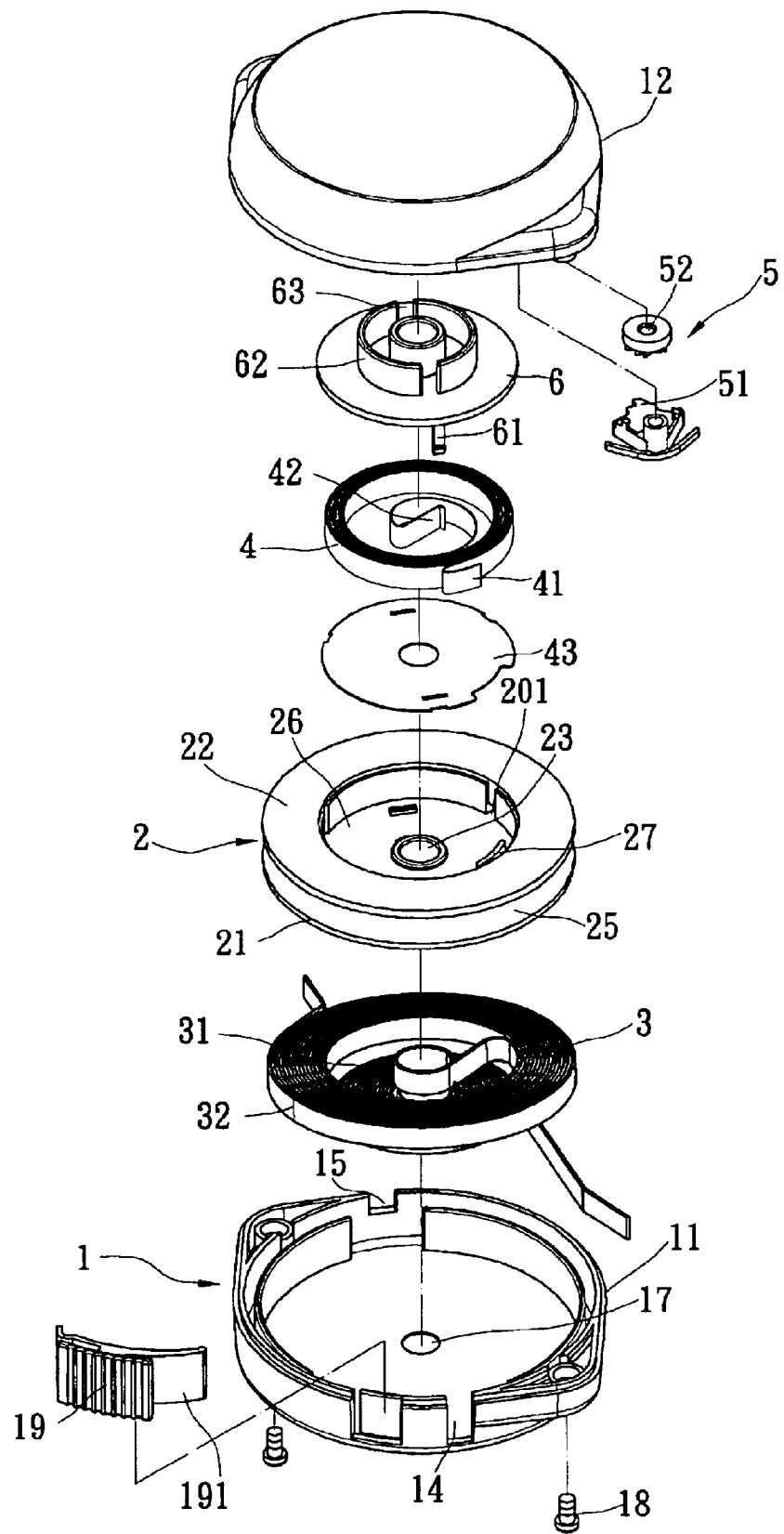
FIG. 1 is an exploded view of a retractable cable device according to the first embodiment of the present invention.
Figure 2:
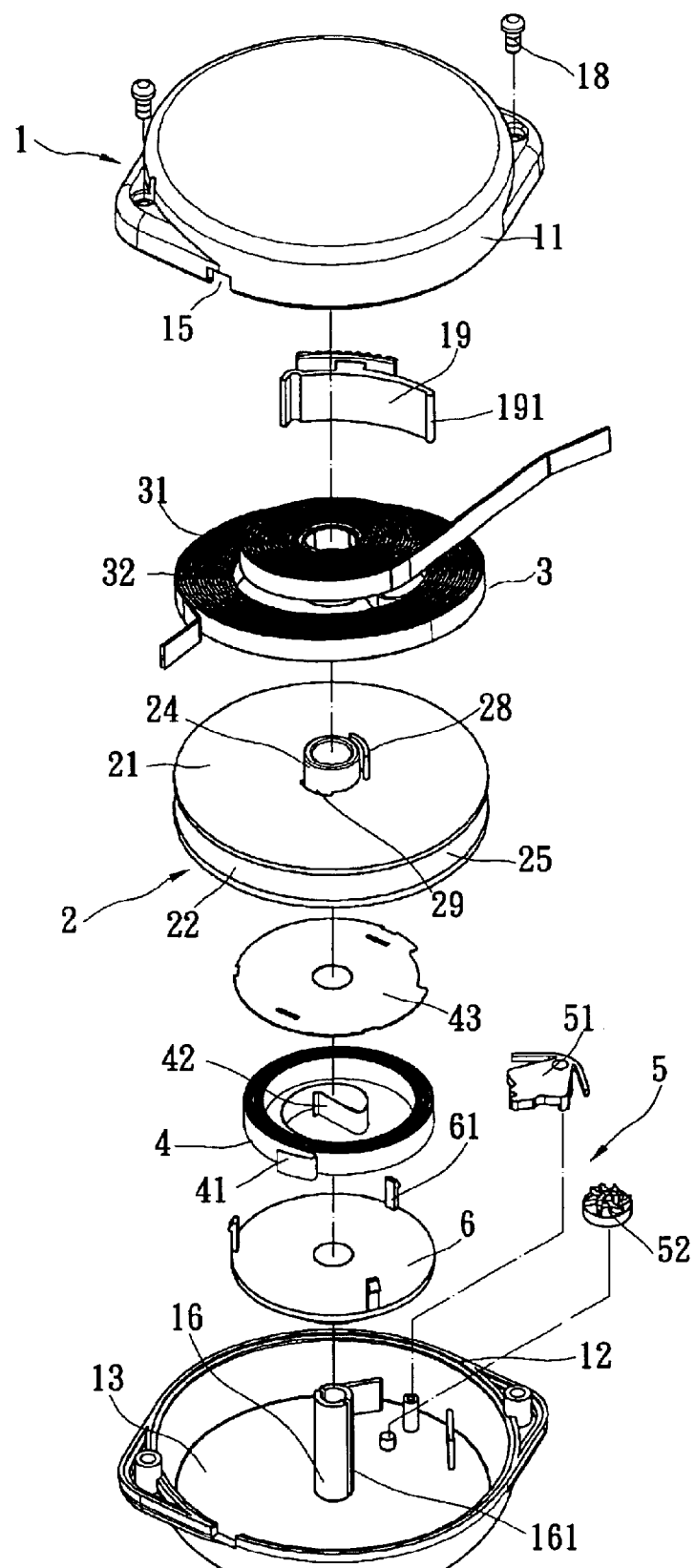
FIG. 2 is another exploded view of a retractable cable device according to the first embodiment of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1–6 illustrate the first embodiment of a retractable cable device in accordance with of the present invention. Referring to FIGS. 1–6, the retractable cable device has a housing 1, a winding spool 2, a communication cable 3 and a spiral spring 4.

The housing 1 is a hollow object and includes a first cover 11 and a second cover 12. The first cover 11 and the second cover 12 are coupled together by a screw 18 or snapping. A receiving space 13 is positioned within the housing 1 and is used to receive the communication cable 3, the winding spool 2 and the spiral spring 4. A first cable slot 14 is positioned at the periphery of the receiving space 13, and one end of the communication cable 3 extends through the first cable slot 14. A second cable slot 15 is positioned at the periphery of the receiving space 13, and the other end of the communication cable 3 extends through the second cable slot 15. A shaft 16 is hallow and positioned within the receiving space 13 of the second cover 12. A hole 17 is integrally formed with the first cover 11 and is used to receive one end of the shaft 16.

The winding spool 2 includes a first spool disk 21 and a second spool disk 22. The first spool disk 21 is integrally formed with the second spool disk 22, or the first spool disk 21 is connected with the second spool disk 22 by snapping. An opening 23 is integrally formed with the first spool disk 21 and the second spool disk 22.

A winding shaft 24 is hallow and integrally formed with the first spool disk 21, and a receiving groove 25 is positioned between the first spool disk 21 and the second spool disk 22. A protrusion 28 is positioned near the winding shaft 24 and is integrally formed with the first spool disk 21. The protrusion 28 is cylinder-shaped or curved plate. A slot 29 is positioned at the first spool disk 21 and passes through both sides of the first spool disk 21. A spring receiving space 26 is positioned at the second spool disk 22 and has a protrusion 27. The receiving space 13 of the housing 1 is used to receive the winding spool 2, and the shaft 16 passes through the opening 23 so that the winding spool 2 is pivotally connected to the shaft 16 and rotatable within the receiving space 13.

Both ends of the communication cable 3 can be connected to connectors or electrical plugs (not shown). The communication cable 3 is wound around the winding shaft 24 of the winding spool 2 so that an inner winding 31 is formed. The other end of the communication cable 3 protrudes through the slot 29 of the first spool disk 21 of the winding spool 2, and the communication cable 3 is wound within the receiving groove 25 so that an outer winding 32 is formed. Thus, the communication cable 3 is respectively positioned in the winding shaft 24 of the first spool disk 21 of the winding spool 2 and the receiving groove 25. The communication cable 3 protrudes between the protrusion 28 and the winding shaft 24 so that the communication cable can be held without being pulled away from the housing 1. Both ends of the communication cable 3 pass through the first cable slot 14 and the second cable slot 15.

The spiral spring 4 is positioned within the spring receiving space 26 of the winding spool 2. An outer end 41 of the spiral spring 4 is hooked by the protrusion 27 of the winding spool 2 so that the spiral spring 4 is operatively connected with the winding spool 2. An inner end 42 of the spiral spring 4 is hooked by a narrow slot 161 of the shaft 16 so that the spiral spring 4 is operatively connected with the housing 1. Thus, the spiral spring 4 is positioned between the housing 1 and the winding spool 2, and elastic energy is stored in the spiral spring 4 when the winding spool 2 rotates.

A separation plate 43 is positioned below the spiral spring 4 and between the spiral spring 4 and the communication cable 3 to avoid friction between the spiral spring 4 and the communication cable 3. Besides, a cover plate 6 is positioned above the spiral spring 4 and used to cover the spring receiving space 26. A plurality of hooks 61 are integrally formed on one surface of the cover plate 6, and a plurality of openings 201 are integrally formed with the winding spool 2 and correspond to the hooks 61 of the cover plate 6. The cover plate 6 is firmly connected with the winding spool 2 when the hooks 61 are snapped into the openings 201.

Figure 3:
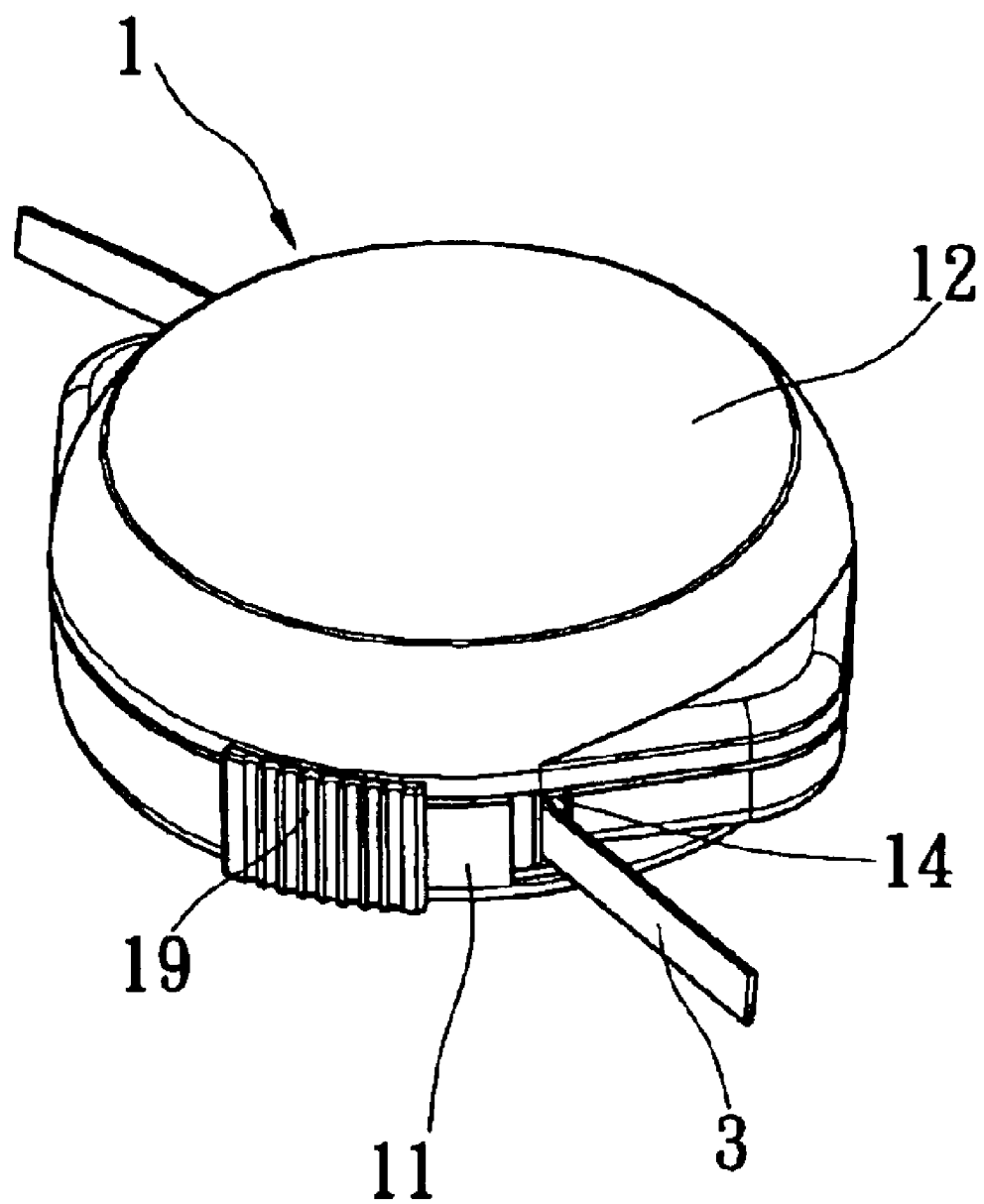
FIG. 3 is a perspective view of a retractable cable device according to the first embodiment of the present invention.
Figure 4:
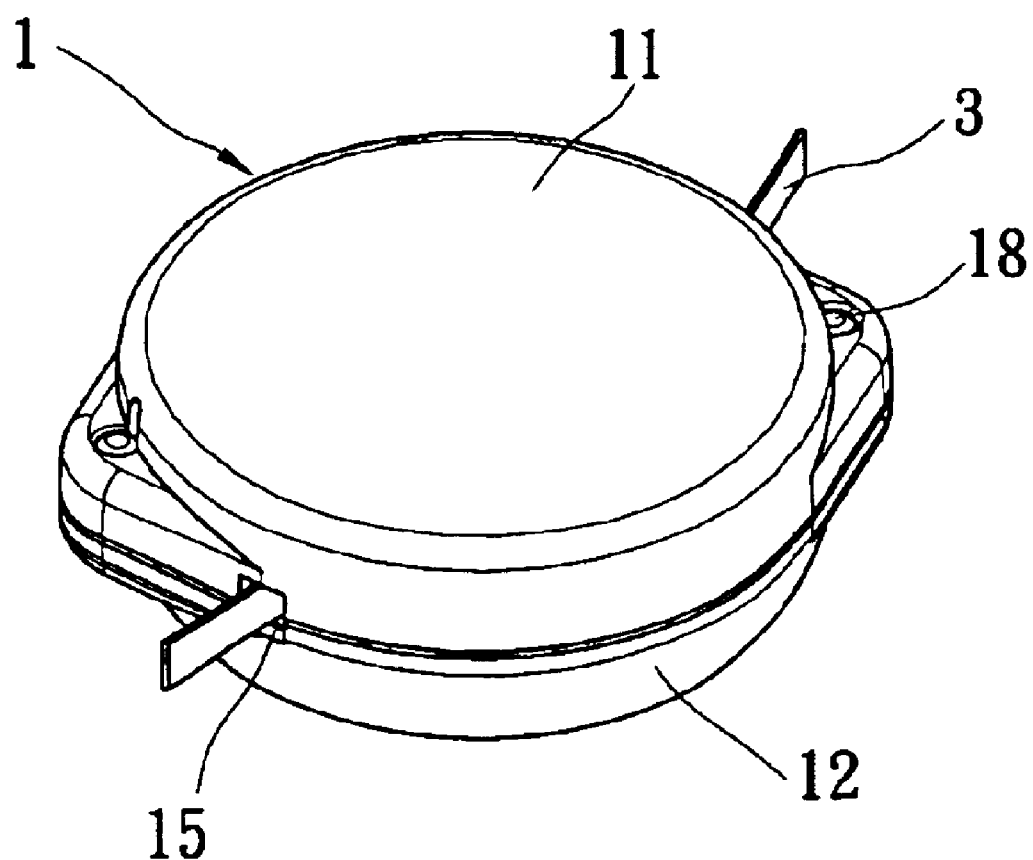
FIG. 4 is another perspective view of a retractable cable device according to the first embodiment of the present invention.
Figure 5:
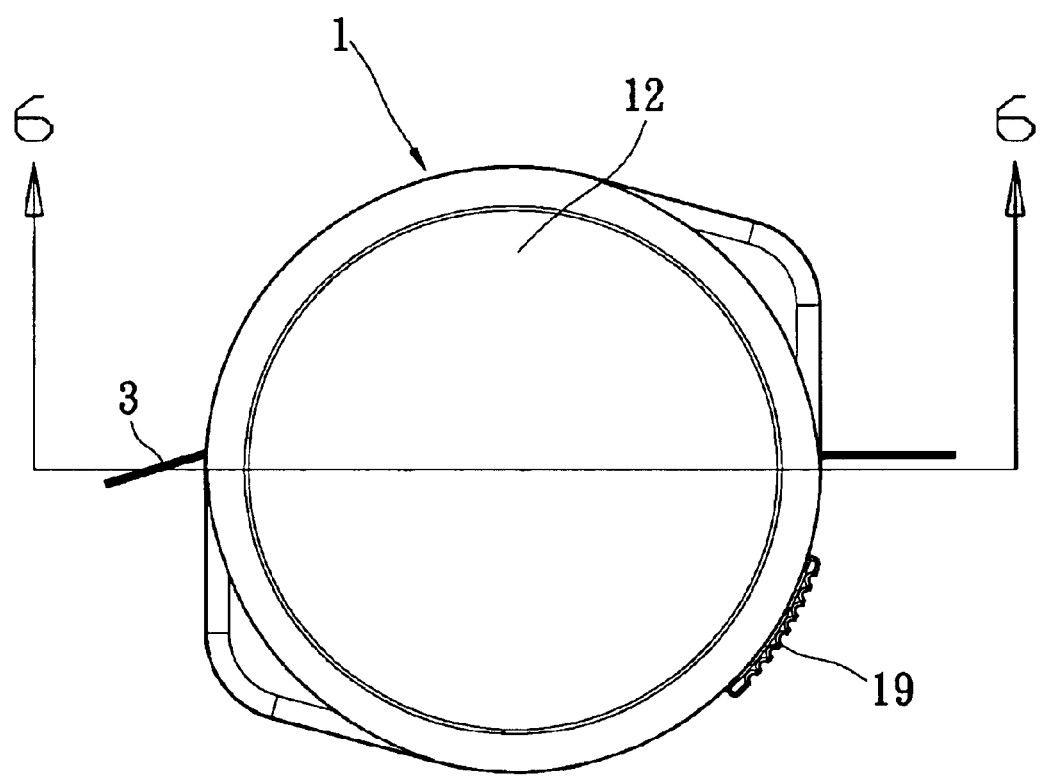
FIG. 5 is a top plan view of the retractable cable device of the present invention.
Figure 6:
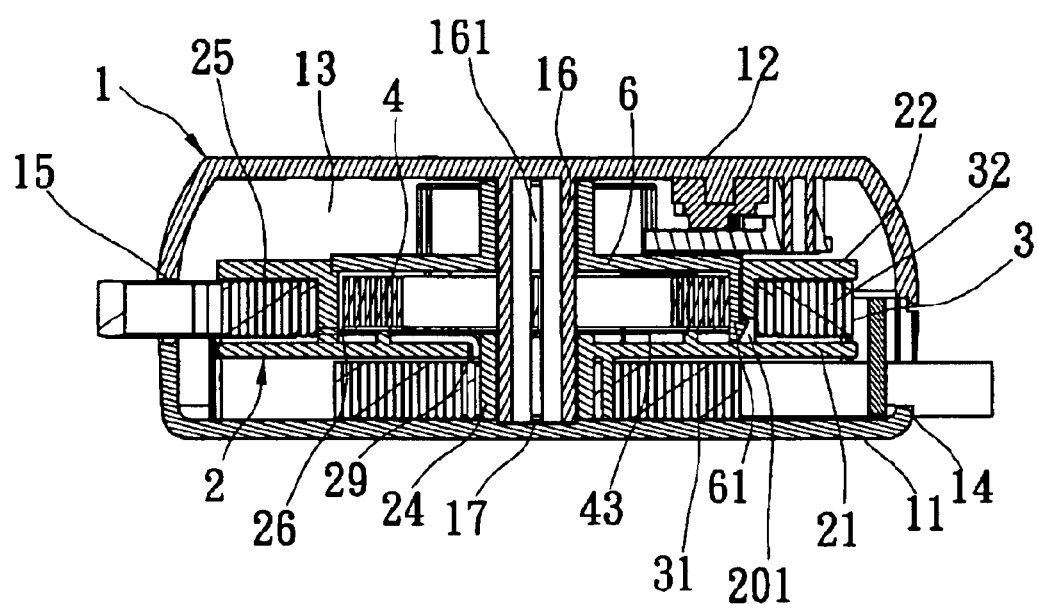
FIG. 6 is a cross-sectional view of the retractable cable device taken along the line 6-6 of FIG. 5.

FIGS. 3 and 4 illustrate a retractable cable device of the present invention. Referring to FIGS. 3 and 4, the retractable cable device can accommodate a longer length of the communication cable 3 and can retract the communication cable 3 if possible. Users can connect connectors or electrical plugs of the communication cable 3 with corresponding electrical receptacle of communication device to download information. Both ends of the communication cable 3 are freely pulled out of the housing 1 and subjected to an equal tensile force because of resilience of the spiral spring 4. Thus, the communication cable 3 will be retracted back to the housing 1 and entanglement of communication cable 3 will not happen.

Furthermore, a positioning ring 62 is integrally formed with the cover plate 6 and has a plurality of notches 63. A spool stop mechanism 5 is installed near the winding spool 2 and includes a rotatable pawl 51 and a rotatable ratchet 52. Users can pull or retract the communication cable 3 by the interconnection among the pawl 51, the ratchet 52 and the notches 63 of the cover plate 6.

Figure 7:
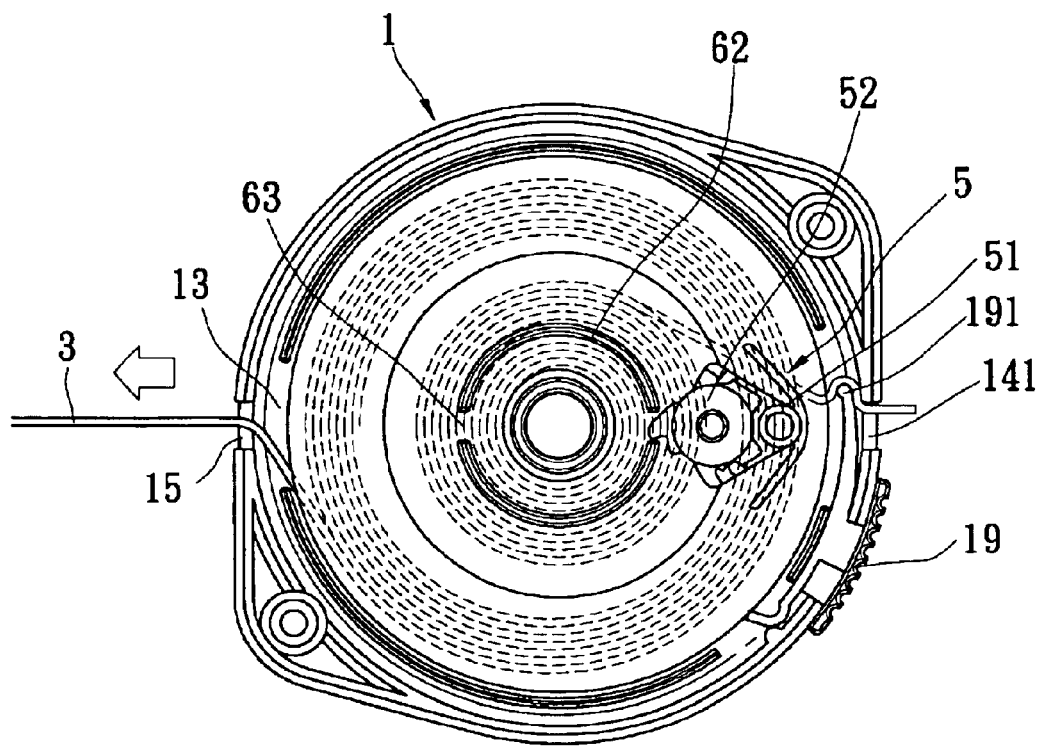
FIGS. 7 and 8 illustrate how the retractable cable device holds and releases the communication cable of the present invention.

A latch button 19 is slidably mounted to the housing 1 and positioned near the first cable slot 14. A latch tip 191 is integrally formed with the latch button 19. When the latch button 19 is pushed toward the first cable slot 14, the latch tip 191 can contact with the communication cable 3 and is used to hold the communication cable 3 (as shown in FIG. 7). Thus, one end of the communication cable 3 is held and cannot be pulled, and the other end of the communication cable 3 can be pulled.

Figure 8:
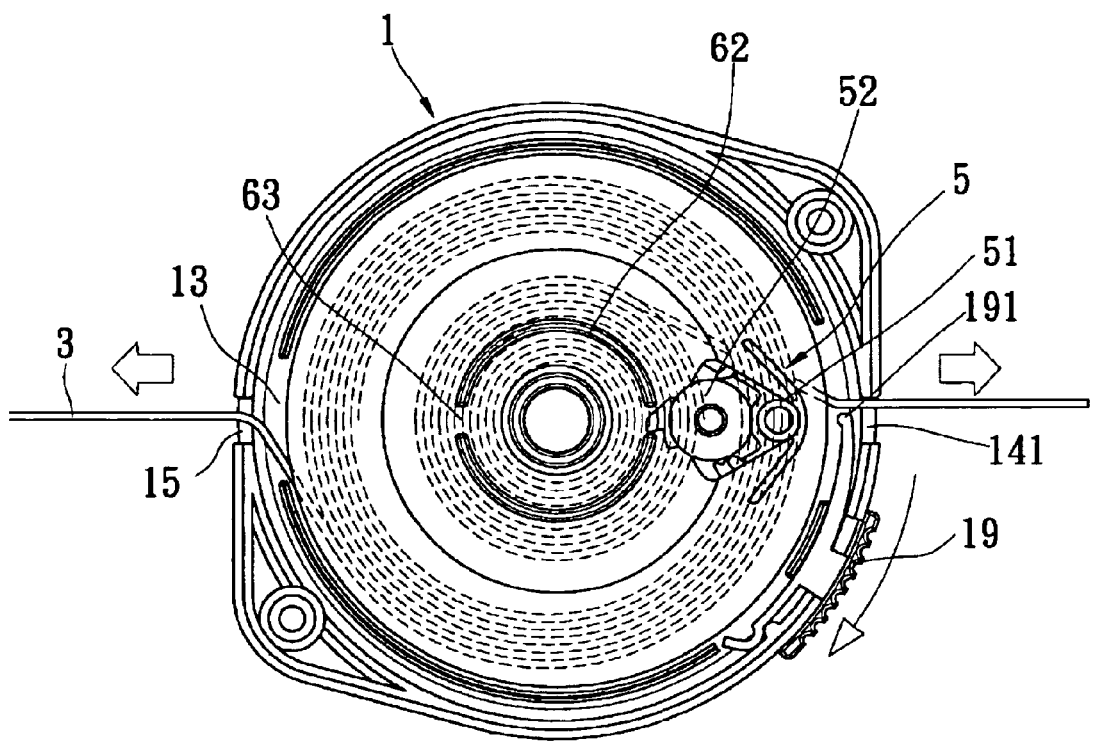

When the latch button 19 is pushed away from the first cable slot 14, the latch tip 191 is not in contact with the communication cable 3 to release the communication cable 3 (as shown in FIG. 8). Thus, both ends of the communication cable 3 can be pulled.

Figure 9:
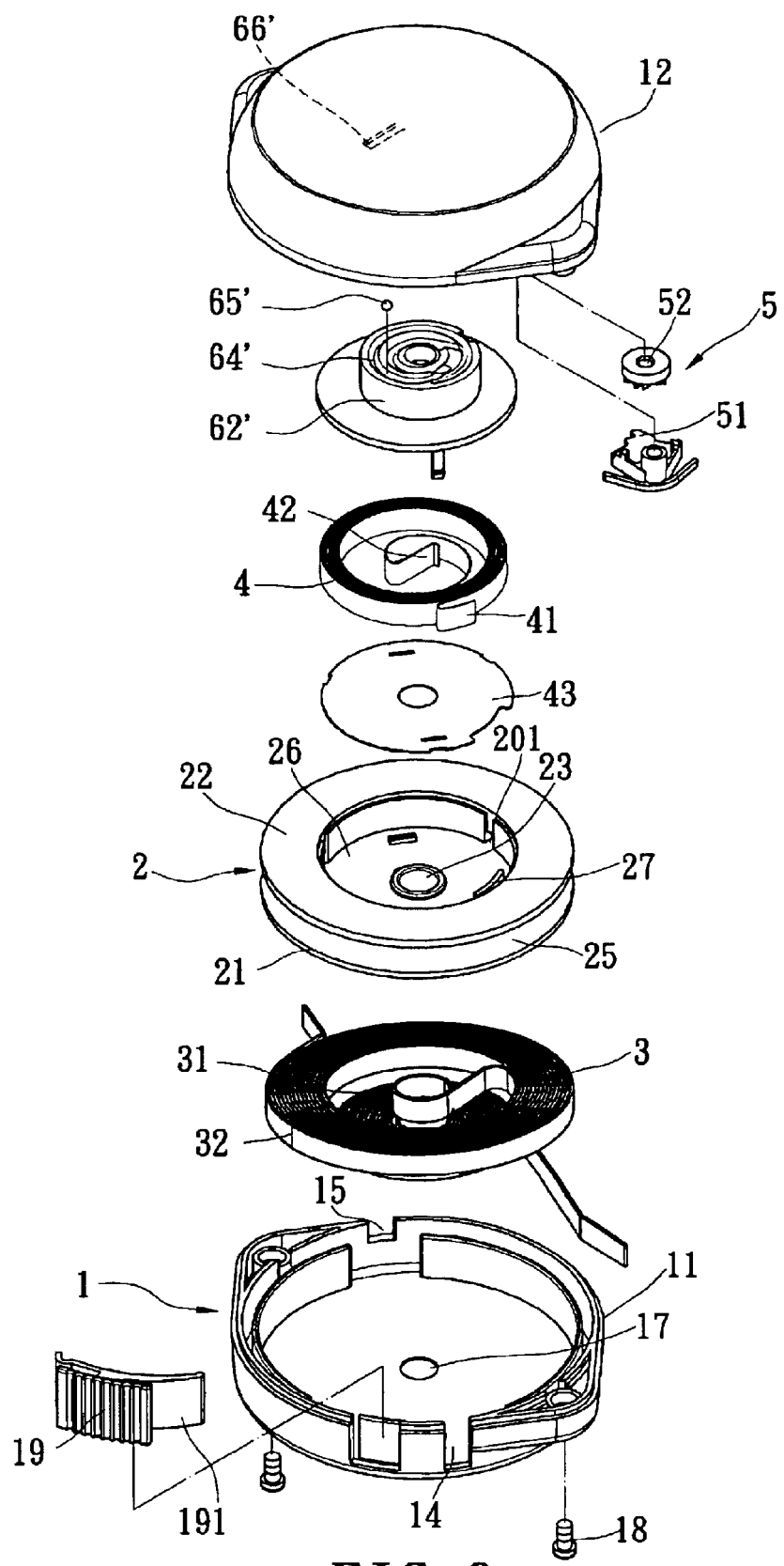
FIG. 9 is an exploded view of a retractable cable device according to the second embodiment of the present invention.

As shown in FIG. 9, a positioning groove 64' is positioned at the positioning ring 62', and a ball 65' is adapted to slide along the positioning groove 64'. A groove 66' is positioned at the inner surface of the housing 1 so that the ball 65' is adapted to slide along the groove 66'. Users can pull or retract the communication cable 3 by the interconnection between the ball 65' and the positioning groove 64' of the cover plate 6.

Figure 10:
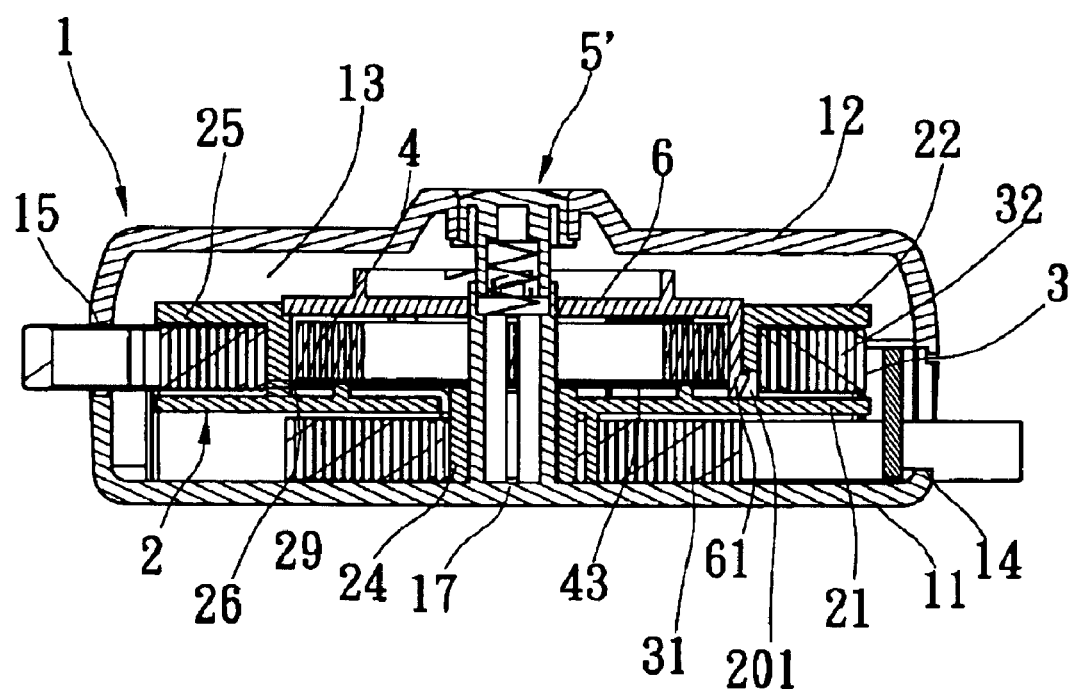
FIG. 10 is a cross-sectional view of the retractable cable device of the third embodiment of the present invention.

As shown in FIG. 10, a reciprocating stop mechanism 5' is installed at the housing 1, and users can stop or retract the communication cable 3 by pushing a switch of the reciprocating stop mechanism 5'.

Figure 11:
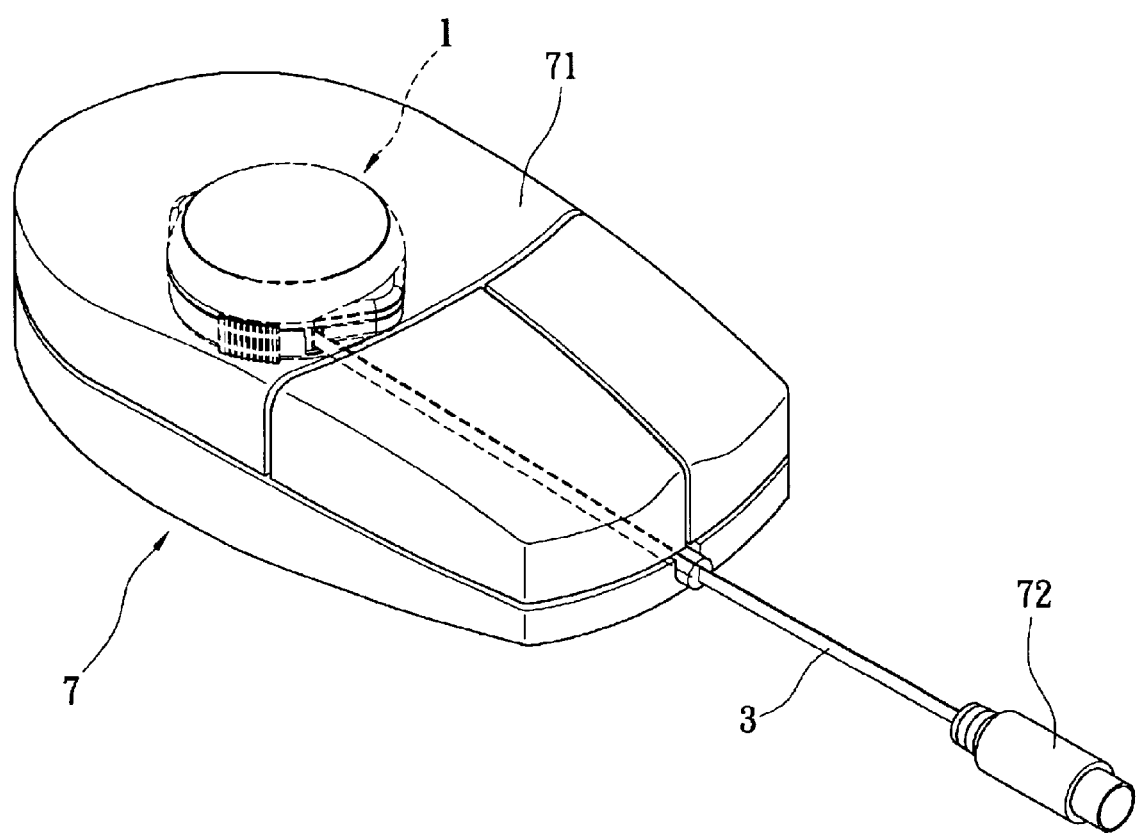
FIG. 11 is a perspective view of a retractable cable device according to the fourth embodiment of the present invention.
Figure 12:
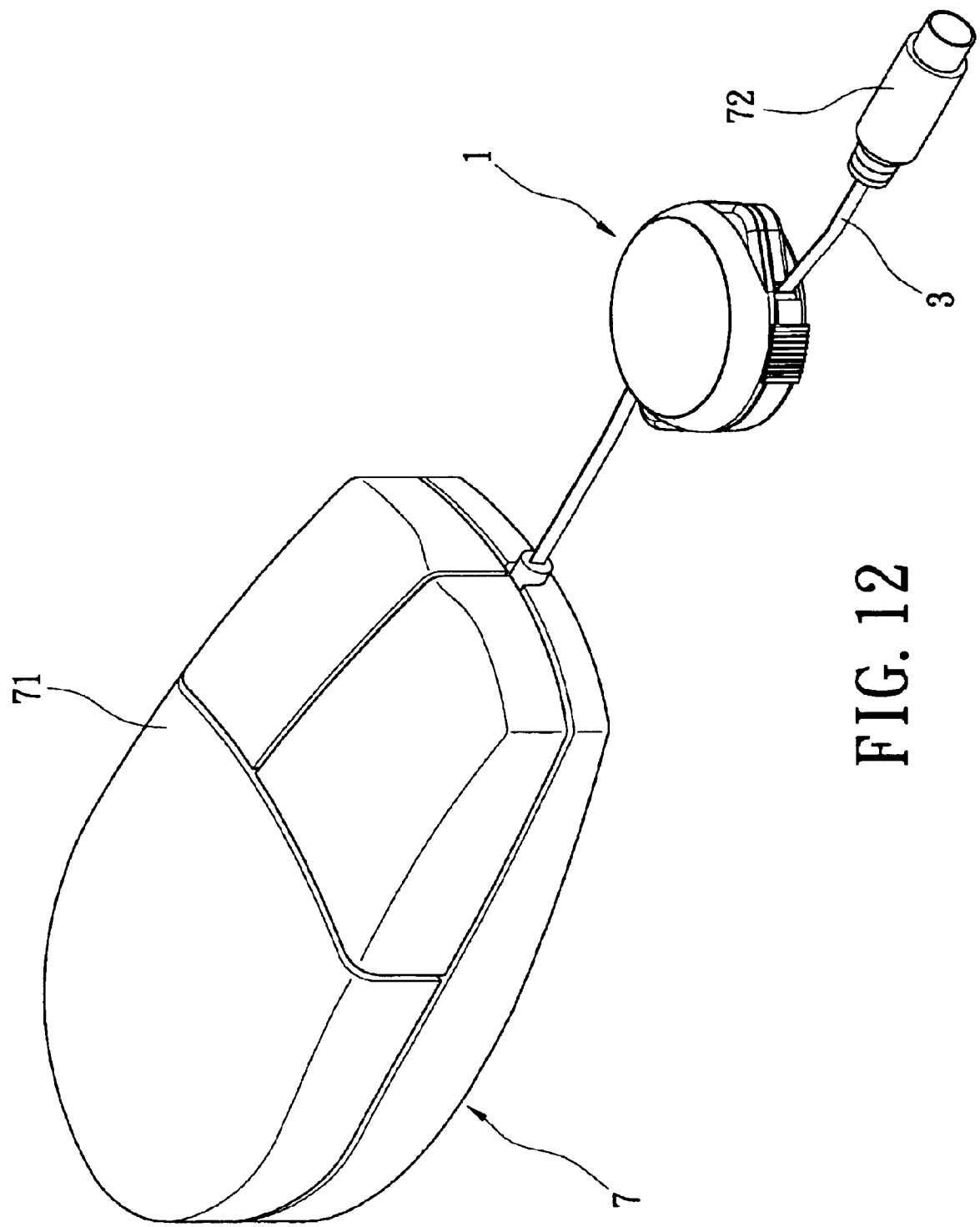
FIG. 12 is a perspective view of a retractable cable device according to the fifth embodiment of the present invention.
Figure 13:
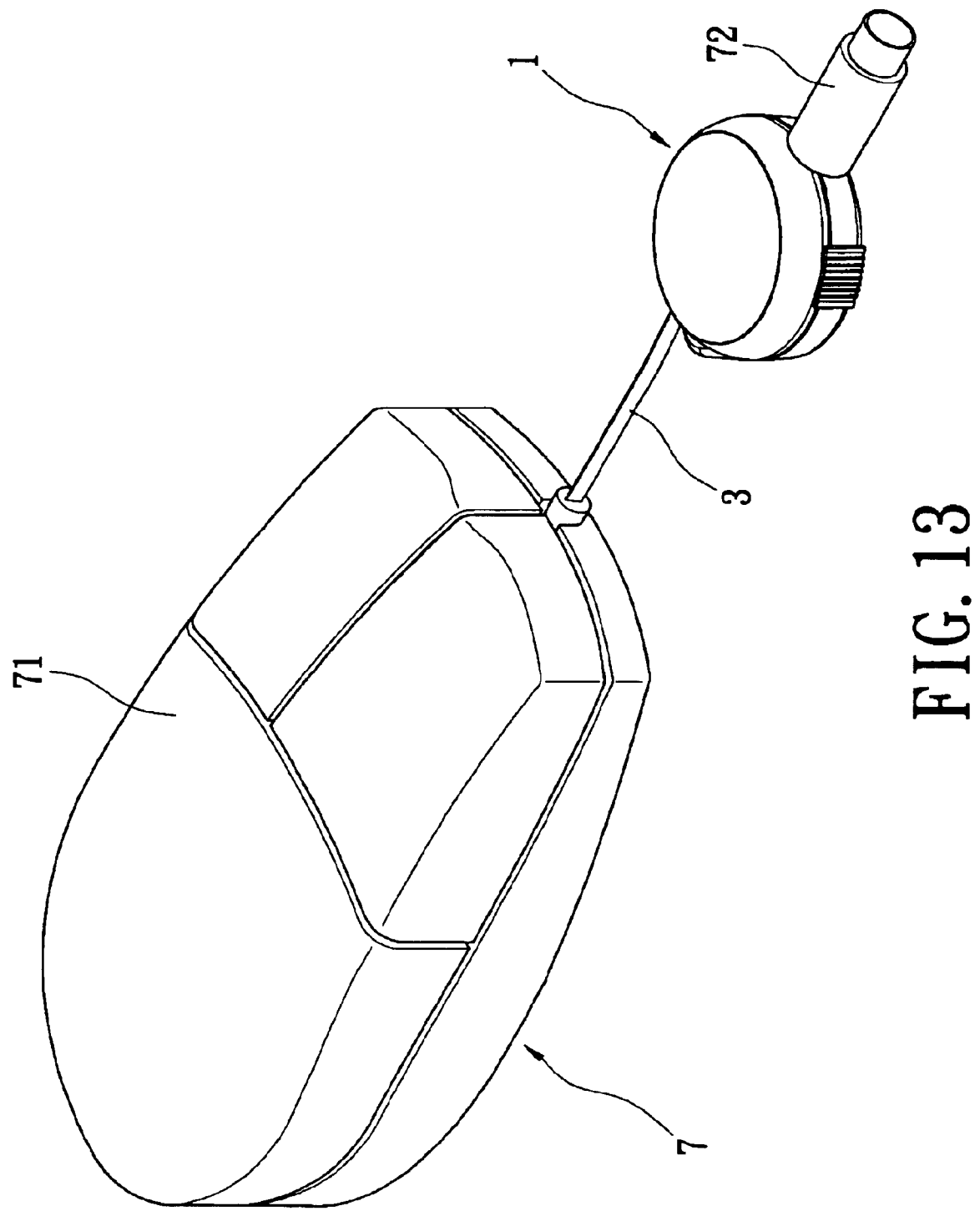
FIG. 13 is a perspective view of a retractable cable device according to the sixth embodiment of the present invention.

Referring to FIGS. 11–13, the retractable cable device of the present invention can be positioned in a mouse 7 with a connection cord. The retractable cable device is positioned within a main body 71 of the mouse 7 (as shown in FIG. 11) or out of the main body 71 of the mouse 7 (as shown in FIGS. 12 and 13). A connector 72 is connected with the communication cable 3 so that the connector 72 can be pulled.

Figure 14:
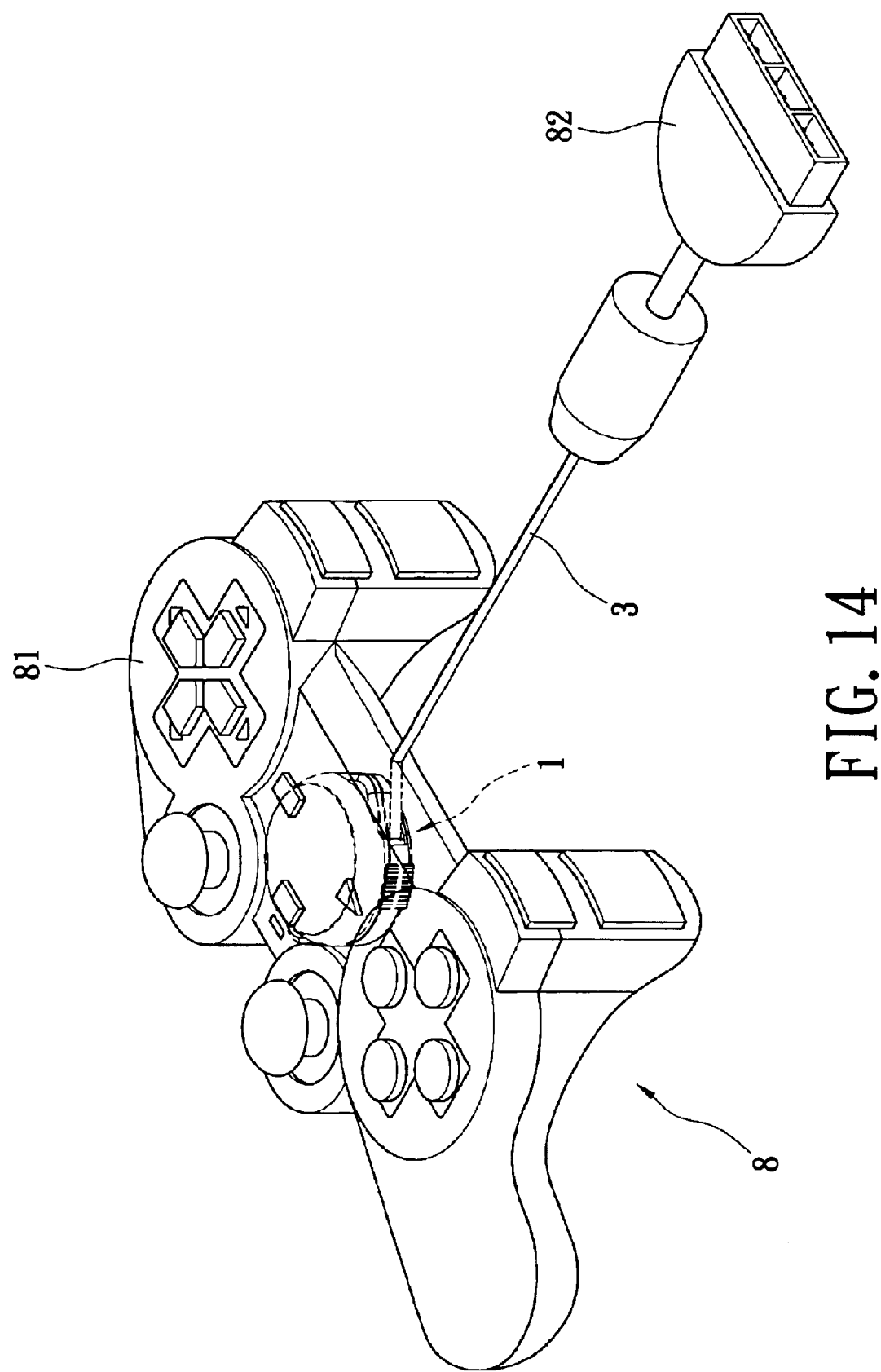
FIG. 14 is a perspective view of a retractable cable device according to the seventh embodiment of the present invention.
Figure 15:
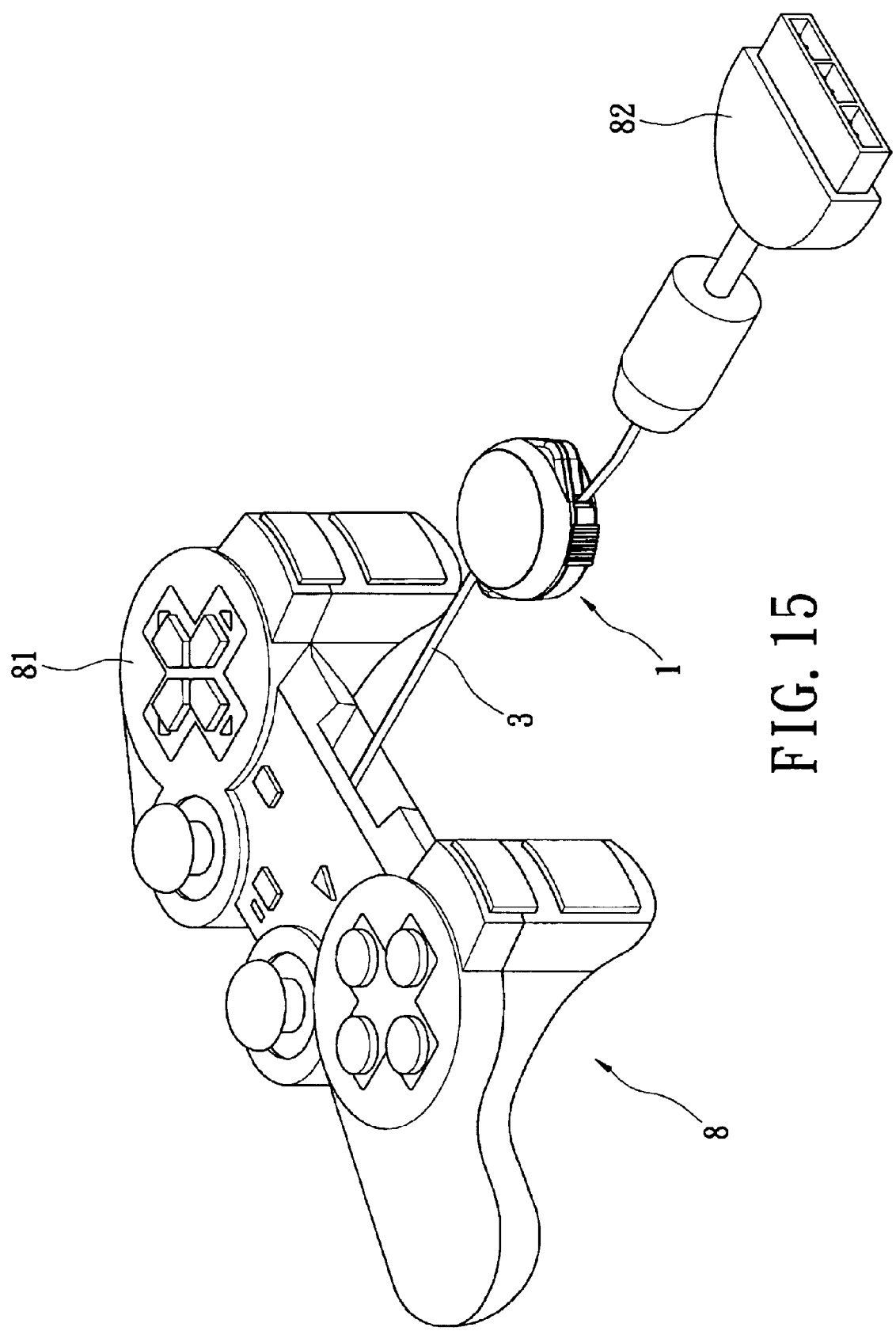
FIG. 15 is a perspective view of a retractable cable device according to the eighth embodiment of the present invention.
Figure 16:
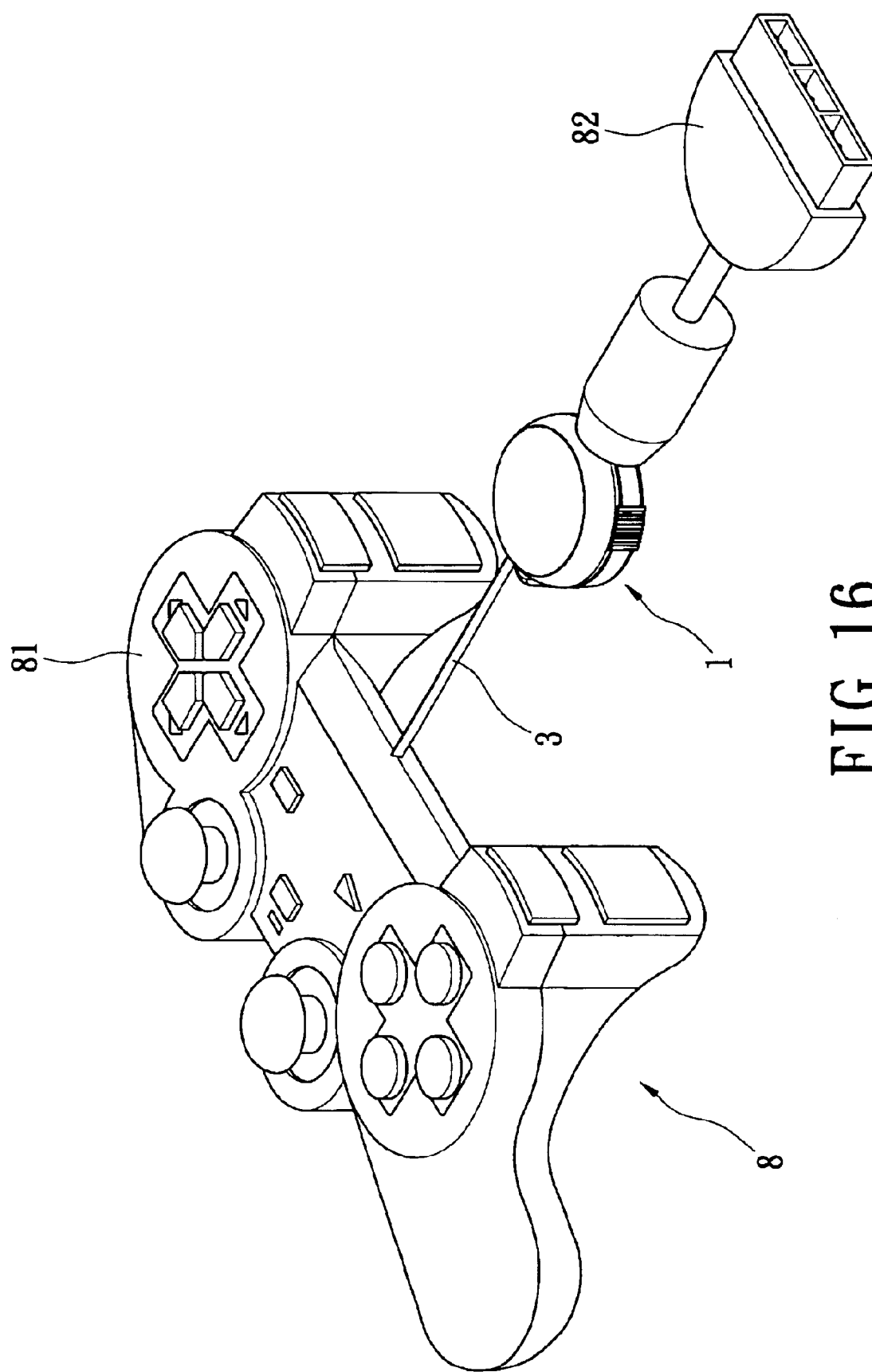
FIG. 16 is a perspective view of a retractable cable device according to the ninth embodiment of the present invention.

As shown in FIGS. 14–16, the retractable cable device of the present invention can be positioned in a game console 8 with the connection cord. The retractable cable device is positioned within a main body 81 of the game console 8 (as shown in FIG. 14) or out of the main body 81 of the mouse 7 (as shown in FIGS. 15 and 16). A connector 82 is connected with the communication cable 3 so that the connector 82 can be pulled.

Figure 17:
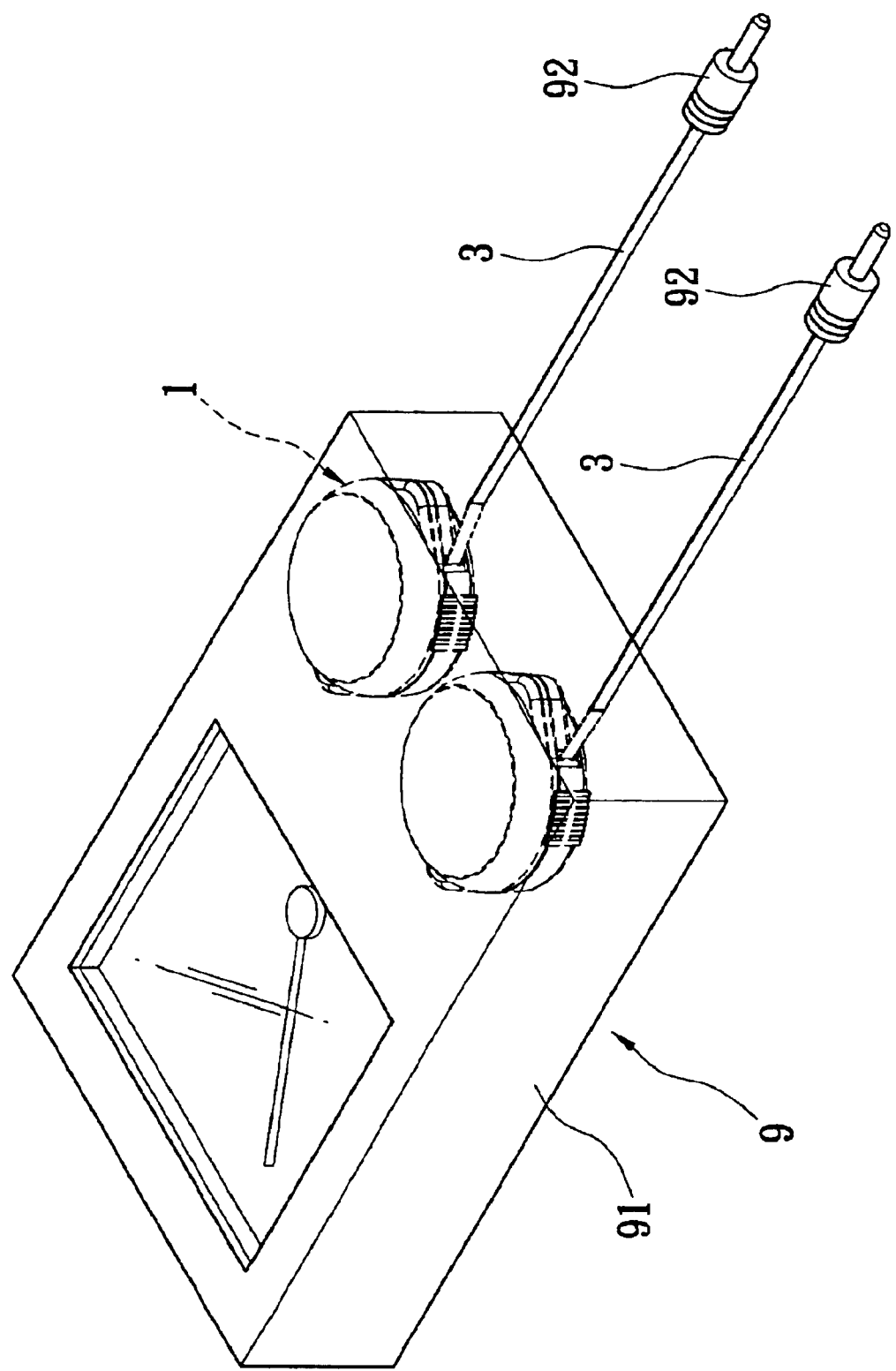
FIG. 17 is a perspective view of a retractable cable device according to the tenth embodiment of the present invention.

Besides, referring to FIG. 17, the retractable cable device of the present invention can be positioned in a kind of meter. For example, the meter can be a multimeter. The retractable cable device is positioned within a main body 91 of the meter 9, and a probe 92 is connected with the communication cable 3 so that the probe 92 can be pulled.

As described above, advantages of the present invention can be summarized below:

1. According to the present invention, the communication cable 3 is respectively positioned in the winding shaft 24 of the first spool disk 21 of the winding spool 2 and the receiving groove 25. When the communication cable 3 is wound around the winding spool 2, the inner winding 31 and the outer winding 32 are separate and the communication cable 3 cannot be limited by the winding spool 2.

2. According to the present invention, the spiral spring 4 is positioned at the spring receiving space 26 of the winding spool 2 so that the space employed by the spiral spring 4 is decreased. Thus, the present invention accommodates a much longer length of the communication cable 3.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A retractable cable device, comprising:

a housing, having a receiving space;

a winding spool, pivotally connected to the housing within the receiving space of the housing and having a first spool disk and a spring receiving space, and the first spool disk having a receiving groove and a second spool disk;

a communication cable, wound around a spool shaft of the winding spool so that an inner winding is formed, and one end of the communication cable passing through the first spool disk of the winding spool so that an outer winding is formed, thereby the communication cable positioned on the winding shaft and the receiving groove and protruding out of the housing; and a spiral spring, positioned at the spring receiving space of the winding spool, and one end of the spiral spring coupled to the winding spool and the other end of the spiral spring coupled to the housing.

2. The retractable cable device as claimed in claim 1, wherein a first cable slot is positioned at the periphery of the receiving space, and the other end of the communication cable extends through the first cable slot.

3. The retractable cable device as claimed in claim 1, wherein a shaft is positioned on one side of the receiving space, and a hole is integrally formed with the other side of the receiving space, and an opening is positioned at the winding spool which is pivotally connected within the receiving space of the housing, and a narrow slot is integrally formed with the shaft and a protrusion is positioned at the winding spool so that one end of the spiral spring is hooked by the protrusion of the winding spool and the other end of the spiral spring is hooked by the narrow slot of the shaft.

4. The retractable cable device as claimed in claim 1, wherein a latch button is slidably mounted to the housing and a latch tip is integrally formed with the latch button so that the latch tip is used to hold the communication cable.

5. The retractable cable device as claimed in claim 1, wherein the receiving groove is positioned between the first spool disk and the second spool disk.

6. The retractable cable device as claimed in claim 1, wherein a slot is positioned at the first spool disk and passes through both sides of the first spool disk.

7. The retractable cable device as claimed in claim 1, wherein a separation plate is positioned below the spiral spring and between the spiral spring and the communication cable.

8. The retractable cable device as claimed in claim 1, wherein a cover plate is positioned above the spiral spring and used to cover the spring receiving space.

9. The retractable cable device as claimed in claim 8, wherein a positioning ring is integrally formed with the cover plate and has a plurality of notches, and a spool stop mechanism is installed near the winding spool and includes a rotatable pawl and a rotatable ratchet so that users can pull or retract the communication cable by the interconnection among the pawl, the ratchet and the notches of the cover plate.

10. The retractable cable device as claimed in claim 8, wherein a positioning groove is positioned at the positioning ring and a ball is adapted to slide along the positioning groove, and a groove is positioned at the inner surface of the housing so that the ball is adapted to slide along the groove so that users can pull or retract the communication cable by the interconnection between the ball and the positioning groove of the cover plate.

11. The retractable cable device as claimed in claim 1, wherein a reciprocating stop mechanism is installed at the housing, and users can stop or retract the communication cable by pushing a switch of the reciprocating stop mechanism.

12. The retractable cable device as claimed in claim 1, wherein the retractable cable device is installed in a mouse.

13. The retractable cable device as claimed in claim 1, wherein the retractable cable device is installed in a game console.

14. The retractable cable device as claimed in claim 1, wherein the retractable cable device is installed in a kind of meter.

* * * * *